US005128578A

United States Patent [19]

Strobl

[11] Patent Number: 5,128,578

[45] Date of Patent: Jul. 7, 1992

[54] COMMUTATOR

[76] Inventor: Georg Strobl, 26 Belleview Drive, 19/F Repulse Bay Garden, Repulse Bay, Hong Kong

[21] Appl. No.: 298,351

[22] Filed: Jan. 18, 1989

[30] Foreign Application Priority Data

Jan. 19, 1988 [GB] United Kingdom ................. 8801093

[51] Int. Cl.[5] ............................................ H02K 13/00

[52] U.S. Cl. .................................... 310/234; 310/233; 310/236

[58] Field of Search ............... 310/233, 234, 235, 236; 29/597

[56] References Cited

U.S. PATENT DOCUMENTS 4,559,464 12/1985 Stokes ................................ 310/233

FOREIGN PATENT DOCUMENTS 0231684 1/1986 German Democratic Rep. .................................. 310/233

1127415 9/1968 United Kingdom .

1130123 10/1968 United Kingdom .

2032196 4/1980 United Kingdom .

*Primary Examiner*—Steven L. Stephan

*Assistant Examiner*—Judson H. Jones

*Attorney, Agent, or Firm*—Fleit, Jacobson, Cohn, Price, Holman & Stern

[57] ABSTRACT

The commutator comprises a commutator base and a plurality of commutator segments. The base is in two parts. One part is a pre-formed base part and the other part is moulded to the base part after the segments have been located on the base part to firmly secure the segments thereto. The commutator is of the barrel-type and the base part is tubular and has castellated ends. The segments have apertured lugs which engage with the castellated ends of the base part and extend inside opposite ends of the base part to locate the segments relative to the base part. The other part of the base forms a sleeve inside the pre-formed base part and firmly secures the lugs and hence the segments to the pre-formed base part.

3 Claims, 1 Drawing Sheet

COMMUTATOR

SUMMARY OF INVENTION

According to the present invention there is provided a commutator comprising a plurality of commutator segments mounted on a pre-formed tubular electrically insulating commutator base part in equi-angularly spaced relationship, each segment having a hook-shaped lug at each of two opposite ends, the hook-shaped lugs extending inside opposite ends of the pre-formed base part and the commutator segments being firmly secured to the pre-formed base part by plastic material moulded to the pre-formed base part and the lugs of the commutator segments.

The segments are thus firmly secured to the base part so that machining, and if necessary welding, can be carried out without displacing the segments relative to the base part.

Preferably, each lug also engages with a respective end of the pre-formed base part so as to locate the lug angularly with respect to the base part. This may be achieved, for example, by providing the ends of the base part with castellations and engaging the lugs with the castellations.

Advantageously, the moulded plastics material forms a sleeve within the pre-formed base part so that this sleeve can be mounted fast on a shaft.

The invention will now be more particularly described by way of example with reference to the accompanying drawings.

DESCRIPTION OF PREFERRED EMBODIMENT

Figure 1:
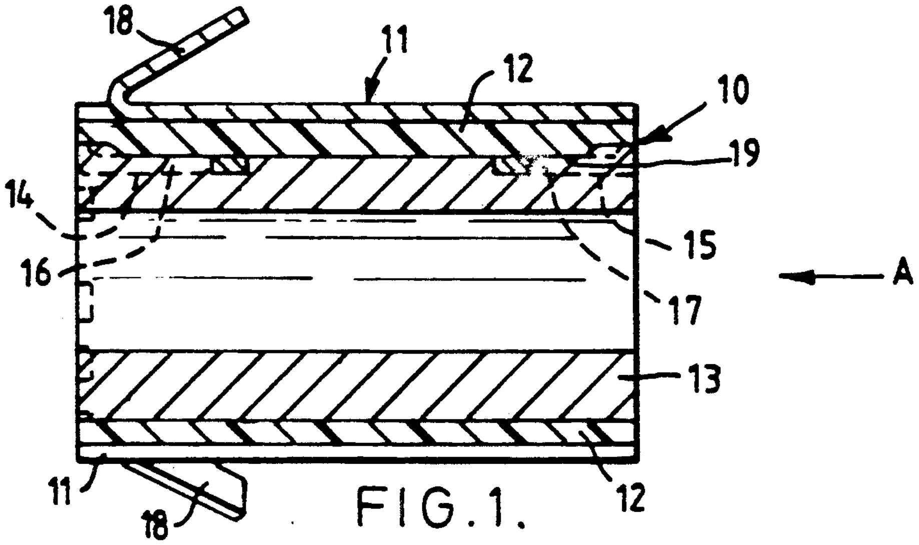
FIG. 1 is a longitudinal section through one embodiment of a commutator according to the invention.
Figure 2:
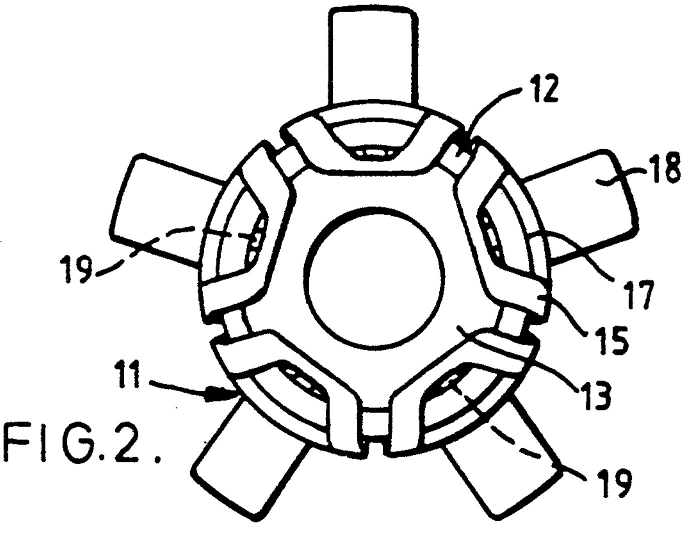
FIG. 2 is an end view taken in the direction of arrow A of FIG. 1.

Referring to the drawings, the barrel commutator shown in FIGS. 1 and 2 comprises a base 10 and a plurality of commutator segments 11 secured to the base 10 in equi-angularly spaced relationship. The base 10 comprises an electrically insulating pre-formed tubular base part 12, typically of plastic material, and a sleeve 13 of moulded material within the base part 12 securing the segments 11 firmly to the base part 12.

Each segment 11 has hook-shaped lugs 14 and 15 at opposite ends to locate the segments 11 on the base part 12. The base part 12 has castellated ends and apertures 16 and 17 in the lugs 14 and 15, respectively, engage with the castellations to locate the segments 11 angularly with respect to the base part 12.

Each segment 11 has an integral tang 18 at one end. The tang 18 is cut out from the lug 14 leaving the aperture 16 and is used to connect a wire of a wound armature to the segment 11.

The inner surface of the base part 12 is uneven to create cavities between the lugs 14 and 15 and the base part 12 so that the moulded material forming the sleeve 13 gets into these cavities to better clamp the segments 11 to the base part 12. In the embodiment shown, longitudinally extending ribs 19 are provided on the inside of the base part 12. These ribs 19 extend beyond the free ends of the hook-shaped lugs 14 and 15 but not to the ends of the base part 12 and support the lugs 14 and 15 away from the inside surface of the base part 12 to create the aforesaid cavities.

Figure 3:
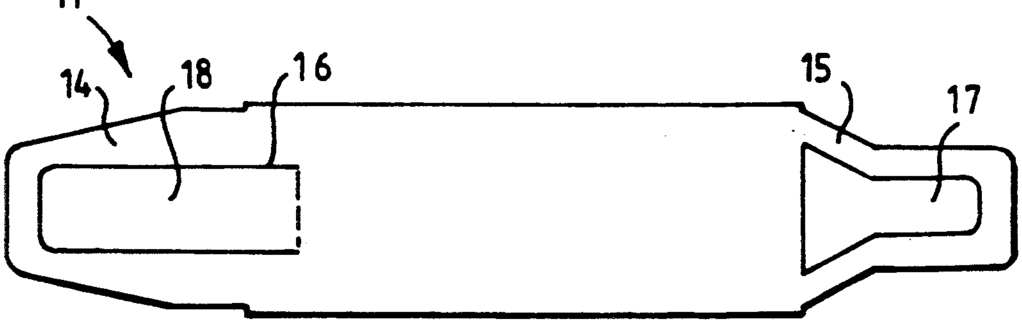
FIG. 3 is a plan view of one of the commutator segments shown partially formed.

The commutator is made as follows:

Each segment 11 is blanked out (see FIG. 3) and formed into its final shape shown in FIGS. 1 and 2 with the exception of the lug 15. The segments 11 are then mounted on the pre-formed base part 12 by sliding them along the base part 12 from the left hand end thereof as viewed in FIG. 1 until the apertures 16 in radial limbs of the lugs 14 engage with the castellations at the left hand end of the base part 12 and the free ends of the longitudinally extending limbs of the lugs 14 contact respective ribs 19. The lugs 15 are then bent over the right hand end of the base part 12 so that the apertures 17 in the radial limbs of the lugs 15 engage with the castellations at the right hand end of the base part 12 and the free ends of the longitudinally extending limbs of the lugs 15 contact respective ribs 19.

The base part 12 together with the commutator segments 11 is then placed in a mould.

Thermoplastics material or injection grade thermosetting plastic material is then introduced into the inside of the base part 12 filling all cavities between the lugs 14 and 15 and the inner surface of the base part 12 and forming the sleeve 13. This moulded sleeve 13 firmly locks the segments 11 to the base part 12 allowing the segments 11 to be machined without risk of displacing the segments 11 with respect to the base part 12.

The finished commutators can then be mounted fast on an armature shaft of an electric motor, typically a small fractional horsepower p.m.d.c. motor, and the armature winding is welded or otherwise secured to the tangs 18.

The above embodiment is given by way of example only and various modifications will be apparent to persons skilled in the art without departing from the scope of the invention defined by the appended claims.

What I claim is:

1. A commutator comprising a pre-formed tubular electrically-insulating commutator base part, a plurality of commutator segments mounted on the base part in equi-angularly spaced relationship, each segment having two opposite ends and a hook-shaped lug at each of said two opposite ends, the hook-shaped lugs extending inside opposite ends of the pre-formed base part, to engage with and locate the segment in position on the base part, plastic material moulded to the pre-formed base part and the lugs of the commutator segments to firmly secure the commutator segments to the pre-formed base part, and castellations on the ends of the pre-formed base part with the lugs engaged over the castellations.

2. A commutator as claimed in claim 1, wherein the molded plastic material forms a sleeve within the pre-formed base part.

3. A commutator as claimed in claim 1, wherein the inner surface of the pre-formed base part is uneven to create cavities between the lugs and the pre-formed base part, which cavities are filled with the moulded plastic material.

* * * * *